(12) United States Patent
Starowesky et al.

(10) Patent No.: US 12,289,571 B2
(45) Date of Patent: *Apr. 29, 2025

(54) SYSTEMS AND METHODS FOR AT-HOME MONITORING OF AN INDIVIDUAL

(71) Applicant: UNIVERSITY OF SOUTH FLORIDA, Tampa, FL (US)

(72) Inventors: Reese Kyle Starowesky, Fayetteville, GA (US); Carlos Eduardo Pena Duran, Tampa, FL (US); Autar Kaw, Tampa, FL (US); Ali Yalcin, Tampa, FL (US); Carla Vandeweerd, Wesley Chapel, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/180,031

(22) Filed: Mar. 7, 2023

(65) Prior Publication Data
US 2023/0224613 A1   Jul. 13, 2023

Related U.S. Application Data

(63) Continuation of application No. 17/187,489, filed on Feb. 26, 2021, now Pat. No. 11,600,161, which is a
(Continued)

(51) Int. Cl.
*H04Q 9/00* (2006.01)
*G01G 19/44* (2006.01)
(Continued)

(52) U.S. Cl.
CPC .............. *H04Q 9/00* (2013.01); *G01G 19/44* (2013.01); *G01G 19/52* (2013.01); *G01G 21/28* (2013.01);
(Continued)

(58) Field of Classification Search
CPC .. H04Q 9/00; H04Q 2209/40; H04Q 2209/84; G01G 19/44; G01G 19/52;
(Continued)

(56) References Cited

U.S. PATENT DOCUMENTS

| 5,510,581 A | 4/1996 | Angel |
| 5,751,214 A | 5/1998 | Cowley et al. |

(Continued)

OTHER PUBLICATIONS

Bangalore et al. "Body-Weight Fluctuations and Outcomes in Coronary Disease" The New England Journal of Medicine Downloaded from nejm.org on Nov. 3, 2020.
(Continued)

*Primary Examiner* — Adnan Aziz
(74) *Attorney, Agent, or Firm* — Quarles & Brady LLP

(57) ABSTRACT

In one embodiment, a sensor unit includes an outer housing including a top plate and a base member that together define an interior space, the top plate being configured to directly receive and support the leg of the piece of furniture, a load cell provided within the interior space configured to measure forces imposed by the leg on the top plate, the load cell including a planar metal plate having a deformable element to which the top plate is mounted and a sensor element mounted to the planar metal plate at a location at which the deformable element extends from the remainder of the planar metal plate, and an internal platform provided within the interior space and associated with the base member that supports the planar metal plate of the load cell in a manner in which the deformable element of the planar metal plate is free to deform when a force is imposed by the leg on the top plate.

20 Claims, 3 Drawing Sheets

Related U.S. Application Data continuation of application No. 16/509,407, filed on Jul. 11, 2019, now Pat. No. 11,051,086.

(60) Provisional application No. 62/696,533, filed on Jul. 11, 2018.

(51) Int. Cl.

| | | |
|---|---|---|
| *G01G 19/52* | (2006.01) | |
| *G01G 21/28* | (2006.01) | |
| *G01G 23/37* | (2006.01) | |
| *G08B 21/04* | (2006.01) | |
| *G08B 21/22* | (2006.01) | |

(52) U.S. Cl.
CPC ..... *G01G 23/3728* (2013.01); *G08B 21/0461* (2013.01); *G08B 21/22* (2013.01); *H04Q 2209/40* (2013.01); *H04Q 2209/84* (2013.01)

(58) Field of Classification Search
CPC .............. G01G 21/28; G01G 23/3728; G01G 23/3735; G01G 3/14; G01G 19/445; G08B 21/0461; G08B 21/22; G01L 1/044; G01L 1/2206; A61B 2562/166; A61B 2562/0252
See application file for complete search history.

(56) References Cited

U.S. PATENT DOCUMENTS

| | | | |
|---|---|---|---|
| 5,780,798 A | 7/1998 | Hall-Jackson | |
| 5,810,392 A | 9/1998 | Gagnon | |
| 5,844,488 A | 12/1998 | Musick | |
| 6,067,019 A | 5/2000 | Scott | |
| 7,078,630 B2 | 7/2006 | Martin-Woodin et al. | |
| 7,214,892 B2 | 5/2007 | Williamson | |
| 7,235,746 B2 | 6/2007 | Williamson | |
| 7,500,280 B2 | 3/2009 | Dixon et al. | |
| 7,656,299 B2 | 2/2010 | Gentry et al. | |
| 7,994,440 B2 | 8/2011 | Oseko | |
| 8,344,272 B1 | 1/2013 | Goldberg et al. | |
| 9,869,578 B2 | 1/2018 | Waldmann | |
| 10,276,021 B2 * | 4/2019 | Pirio .................... | A61B 5/6892 |
| 10,365,149 B2 | 7/2019 | Gough | |
| 10,466,094 B2 | 11/2019 | Lin | |
| 10,520,353 B1 | 12/2019 | Shi | |
| 10,605,650 B2 | 3/2020 | Hatcho | |
| 10,677,639 B2 | 6/2020 | Miyawaki | |
| 10,928,242 B2 | 2/2021 | Chen | |
| 10,940,065 B2 | 3/2021 | Childs | |
| 10,962,406 B2 | 3/2021 | Smith | |
| 10,969,267 B1 | 4/2021 | Franklin | |
| 11,013,867 B2 | 5/2021 | Hendrix | |
| 11,051,086 B1 | 6/2021 | Starowesky | |
| 2003/0089531 A1 | 5/2003 | Montagnino | |
| 2005/0178590 A1 | 8/2005 | Martin-Woodin | |
| 2006/0028350 A1* | 2/2006 | Bhai .................... | A61B 5/1115 |
| | | | 177/144 |
| 2006/0152378 A1 | 7/2006 | Lokhorst et al. | |
| 2010/0155152 A1* | 6/2010 | Weichao .................. | G01G 3/14 |
| | | | 177/211 |
| 2016/0063846 A1* | 3/2016 | Lemire ................ | A61G 7/0527 |
| | | | 340/573.1 |
| 2016/0327427 A1 | 11/2016 | Briones | |
| 2017/0067774 A1* | 3/2017 | Gough ................. | A61G 7/0527 |
| 2017/0199073 A1 | 7/2017 | Carreel et al. | |
| 2017/0326010 A1* | 11/2017 | Lemire ................ | G01G 19/021 |
| 2018/0008168 A1* | 1/2018 | Pearlman ............... | A61B 5/002 |
| 2018/0335336 A1 | 11/2018 | Gyi | |
| 2019/0265095 A1 | 8/2019 | Jun | |
| 2019/0298229 A1* | 10/2019 | Kostic .................. | A61G 7/0524 |
| 2021/0213212 A1 | 7/2021 | Hendrix et al. | |
| 2021/0239547 A1 | 8/2021 | Tanaka | |
| 2021/0298683 A1 | 9/2021 | Jung et al. | |
| 2021/0345910 A1* | 11/2021 | Pearlman .................. | G01L 1/26 |

OTHER PUBLICATIONS

Gaddam et al. "Necessity of a Bed-sensor in a Smart Digital Home to Care for Elder-People" IEEE Sensors 2008 Conference.
Installing operating system images, Raspberry Pi Documentation, https://www.raspberrypi.org/documentation/installation/installing-images/.
Kaw et al. "A sensor for bed occupancy and exit, and weight of bed occupant" EML 4552 Senior Mechanical Design, Wechnical Design Report. Dec. 5, 2017.
Kim et al. "Associations of Variability in Blood Pressure, Glucose and Cholesterol Concentrations, and Body Mass Index With Mortality and Cardiovascular Outcomes in the General Population" Circulation. 2018; 138:2627-2637. 001: 10.1161/CIRCULATIONAHA. 118.034978.
Nutt, et al. "Sleep disorders as core symptoms of depression" Dialogues Clin Neurosci. 2008; 10:329-336.
24-Bit Analog-to-Digital Converter (ADC) for Weigh Scales, AVIA Semiconductor.

* cited by examiner

SYSTEMS AND METHODS FOR AT-HOME MONITORING OF AN INDIVIDUAL

CROSS-REFERENCE TO RELATED APPLICATION

This application is a continuation of, and claims priority to, U.S. application Ser. No. 17/187,489, filed Feb. 26, 2021, which is a continuation of, and claims priority to, U.S. application Ser. No. 16/509,407, filed Jul. 11, 2019, which claims priority to U.S. Provisional Application Ser. No. 62/696,533, filed Jul. 11, 2018, which are hereby incorporated by reference herein in their entireties.

BACKGROUND

There are emotional benefits to senior adults in living at home. Having the independence and dignity of living at home, as well as a comfortable place for family to visit, are important for maintaining one's quality of life. However, some senior adults must have their activities monitored on a full-time basis due to health or other reasons. This can provide peace of mind for the family members and can be lifesaving in the event of an emergency. For those who cannot afford a full-time live-at-home nurse, a monitoring system is a more affordable alternative to help monitor activity and health in the home environment.

Some existing monitoring systems monitor senior adults using bed sensors. Such systems can detect when the individual is lying in bed. This knowledge of this fact can be important, as it can be an indicator of physical or mental health problems. For example, if the individual stays in bed for abnormal amounts of time, this may be indicative of a physical or mental issue. In one such system, a resistive pressure sensor is used to detect when the individual is in bed. The sensor comprises a thin foam sheet with an electrically conductive fabric laminated on each side. When a person lays on the bed, and therefore the sensor, the foam compresses and holes in the foam sheet enable the two layers of conductive fabric to come into contact, thereby completing a circuit. This binary signal indicating whether or not a person is lying on the sensor is then transmitted to a server computer. While such a system is generally viable, it can report false positives because the circuit often remains closed after the individual has left the bed. In addition, the sensors have been known to fail in the middle of the night, therefore, causing important data to be lost and requiring sensor replacement. In view of these issues with known monitoring systems, it can be appreciated that it would be desirable to have a more reliable monitoring system.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

As described above, it would be desirable to have a reliable system for monitoring when an individual is in bed. Disclosed herein are example at-home monitoring systems that can be used not only to detect when the individual is in his or her bed (or another piece of furniture) but also to estimate the weight of the individual. In some embodiments, the system includes sensor units that are configured to be placed under the legs or feet of a piece of furniture and detect and measure the force applied to the piece of furniture.

In some embodiments, the sensor units are in electrical communication with a central control unit that receives signals from the sensor units, calculates an estimate of the weight of the individual on the piece of furniture, and further wirelessly transmits data, including at least the estimated weight and the times and durations in which the individual is resident on the furniture, to another device, such as a central server computer.

In the following disclosure, various specific embodiments are described. It is to be understood that those embodiments are example implementations of the disclosed inventions and that alternative embodiments are possible. Such alternative embodiments can include non-disclosed hybrid embodiments that comprise aspects of one or more separately described embodiments. All such embodiments are intended to fall within the scope of this disclosure.

Figure 1:
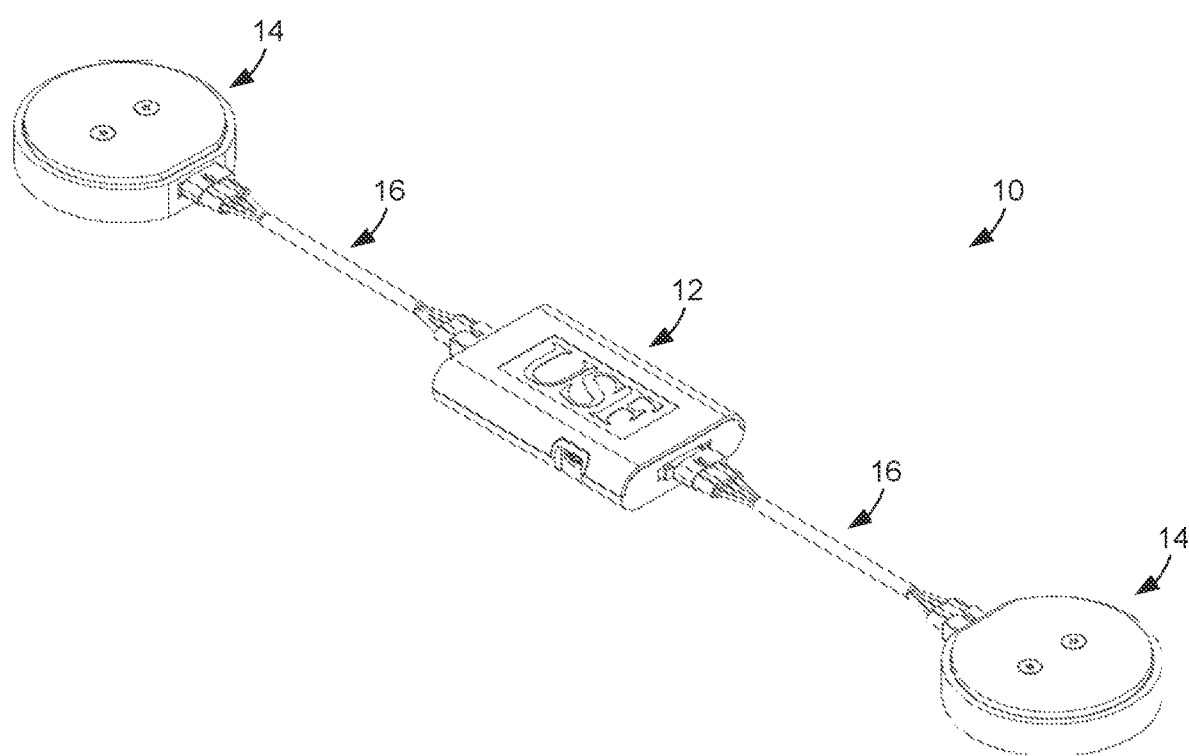
FIG. 1 is a perspective view of an embodiment of an at-home monitoring system.

FIG. 1 illustrates an embodiment of an at-home monitoring system 10 that can be used to monitor the activity and weight of an individual (e.g., patient). In this embodiment, the monitoring system 10 generally comprises a central control unit 12 that is in electrical communication with two sensor units 14. While two sensor units 14 are shown in the figure, the system 10 can comprise a smaller or greater number of sensor units. As illustrated in FIG. 1, the sensor units 14 can each be connected to the central control unit 12 with a communication cable 16.

Figure 2:
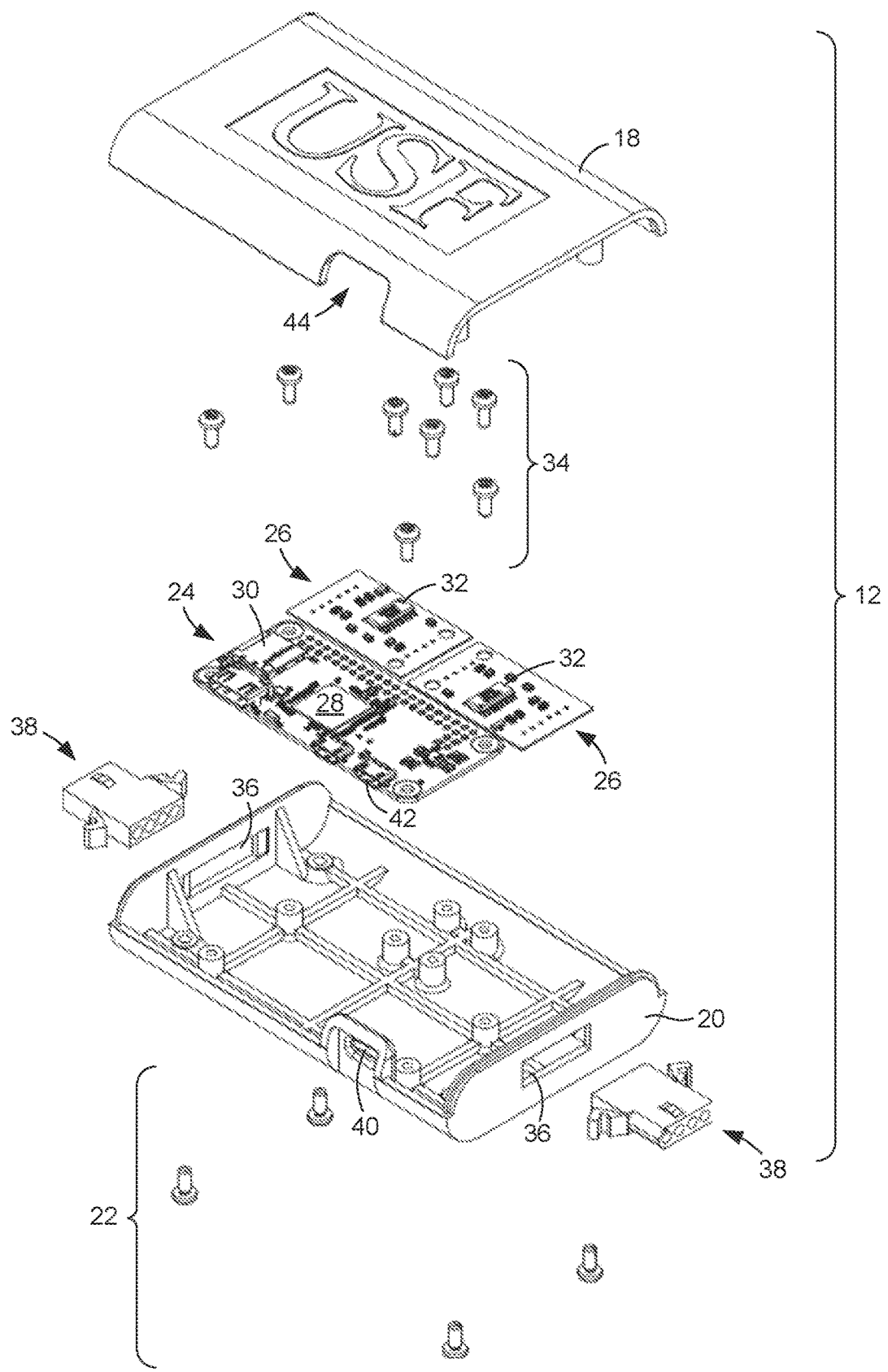
FIG. 2 is an exploded perspective view of an embodiment of a central control unit of the monitoring system shown in FIG. 1.

Turning to FIG. 2, the central control unit 12 comprises an outer housing that, in the illustrated embodiment, includes a top housing member 18 and a bottom housing member 20, which are configured to be secured to each other with fasteners 22, such as threaded bolts or screws. Together, the housing members 18, 20 define an interior space in which various electrical components of the central control unit 12 are provided. In the illustrated embodiment, these electrical components include a primary circuit board 24 and two secondary circuit boards 26. Mounted to the primary circuit board 24 is a central controller 28, in the form of a microcontroller chip, and a wireless communications component 30, in the form of a wireless transmission chip. As described below, the central controller 28 controls overall operation of the central control unit 12 and, by extension, the monitoring system 10 as a whole. In addition, the central controller 28 receives force data collected by the sensor units 14 and, from this data, determines when and how long the individual occupies the piece of furniture as well as calculates an estimated weight of the individual.

The central controller 28 then wirelessly transmits this determined and calculated information to another device, such as a central server or other computer, using the wireless communications component 30. Mounted to each secondary circuit board 26 is an amplifier 32, in the form of an amplifier chip, which amplifies the signals received from the sensor units 14. The circuit boards 24, 26 are secured in place within the interior space defined by the housing members 18, 20 with further fasteners 34, such as threaded bolts or screws that engage the bottom housing member 20.

With further reference to FIG. 2, opposed ends of the bottom housing member 20 each include an opening 36 that is adapted to receive an electrical connector 38 that facilitates connection between the circuit boards 24, 26 and the communication cables 16. In some embodiments, the openings 36 and the electrical connectors 38 are configured so that the connectors can connect to the bottom housing member 20 with a snap fit. A side of the bottom housing member 20 also includes an opening 40 that is configured to provide access to a further electrical connector 42 mounted to the primary circuit board 24 to which a power cord can connect. A notch 44 is formed in the top housing member 18 to avoid covering the opening 40 when the top and bottom housing members are connected to each other.

Figure 3:
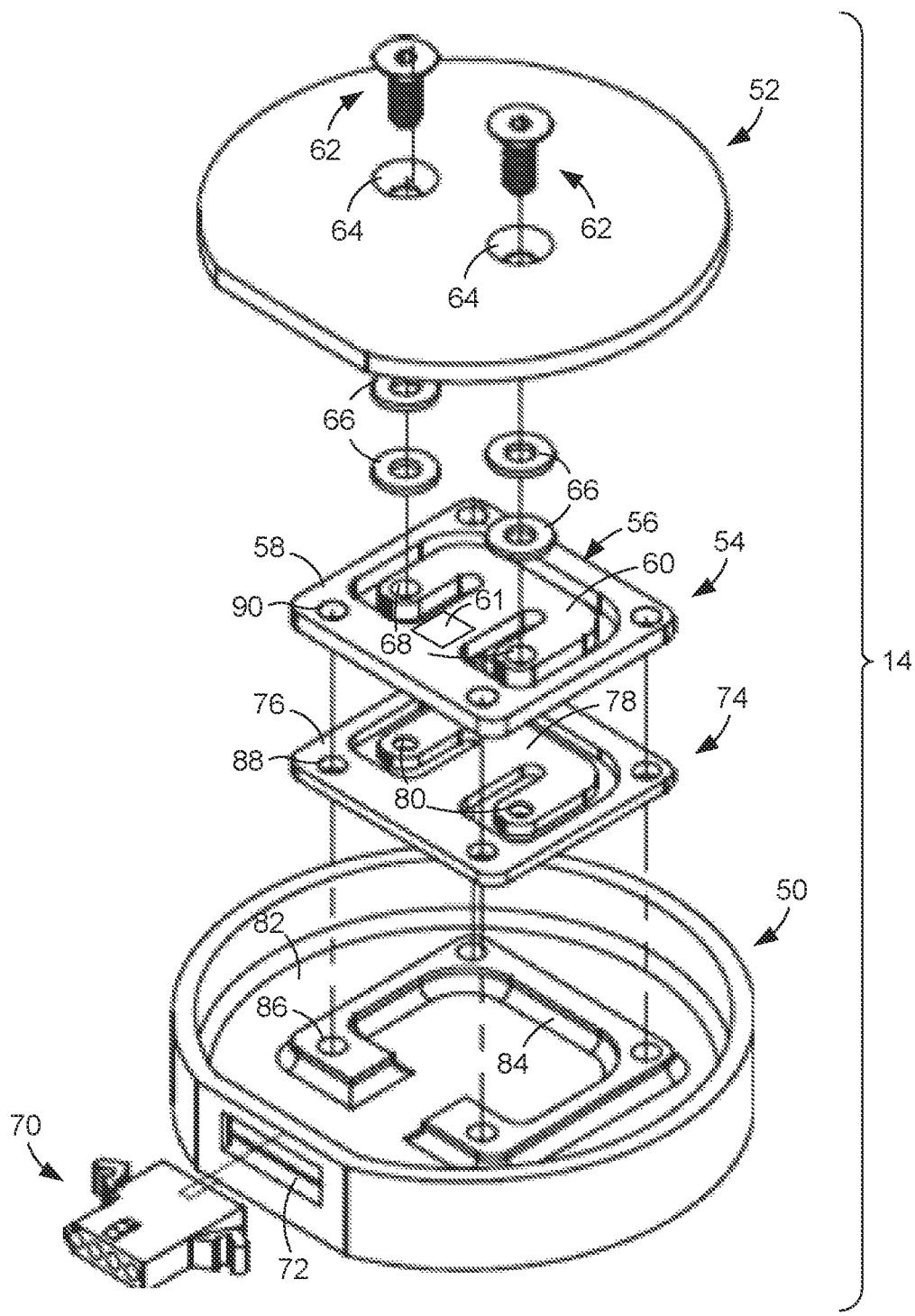
FIG. 3 is an exploded perspective view of an embodiment of a sensor unit of the monitoring system shown in FIG. 1.

FIG. 3 illustrates one of the sensor units 14 in an exploded view. As shown in this figure, the sensor unit 14 comprises a base member 50 that is configured to support the other components of the sensor unit on a floor surface. These other components include a top plate 52 that is configured to support a leg of a piece of furniture with which the monitoring system 10 is to be used. The top plate 52, which is made of a strong material, such as steel, is mounted to and supported by a load cell 54. In the illustrated embodiment, the load cell 54 comprises a planar metal plate 56 having a generally rectangular outer perimeter 58 that surrounds an inner T-shaped deformable element 60.

The top plate 52 mounts to the deformable element 60 with fasteners 62, such as threaded bolts or screws. In particular, the fasteners 62 each pass through an opening 64 formed through the top plate 52, pass through multiple washers 66, and further pass through an opening 68 formed in distal ends of the deformable element 60. With such a configuration, forces transmitted to the top plate 52 are directly transmitted to the deformable element 60. These forces are measured with one or more sensor elements 61, such as one or more strain gauges, which are mounted to the deformable element 60. Wires (not shown) are connected to the sensor elements that extend from the sensor elements 61 to an electrical connector 70 that connects with one of the communication cables 16. As shown in FIG. 3, the electrical connector 70 is configured to mount to and extend through an opening 72 formed in the base member 50.

Positioned beneath the load cell 54 within the base member 50 is a support plate 74 that has a size and configuration similar to the plate 56 of the load cell 54. In particular, the support plate 74 is a planar metal (e.g., steel) plate that comprises a generally rectangular outer perimeter 76 that surrounds an inner T-shaped deformable element 78. With this configuration, the support plate 74 directly supports the load cell 54 and its deformable element 60. Because of this support, the load cell 54 can be used to measure forces that would otherwise exceed its maximum load rating. The fasteners 62 are received in threaded openings 80 that are formed in distal ends of the deformable element 78. Accordingly, the top plate 52 can be fixedly secured to both the deformable element 60 of the load cell 54 and the deformable element 78 of the support plate 74, these deformable elements thereby acting as one integrated component.

With further reference to FIG. 3, the base member 50 also includes an inner base surface 82 from which upwardly extends a raised platform 84 that is sized and shaped to support the rectangular outer perimeter 76 of the support plate 74 and, therefore, the rectangular outer perimeter 58 of the load cell 54, without interfering with deflection of the deformable elements 60 and 78. As shown in the figure, several openings 86 are formed in the raised platform 84. These openings 86 align with openings 88 formed in the rectangular outer perimeter 76 of the support plate 74 and openings 90 formed in the rectangular outer perimeter 58 of the load cell 54. Accordingly, further fasteners (not shown), such as blind rivets can be passed through the load cell 54 and through the support plate 74, and secured to the raised platform 84 of the base member 50 to securely hold both the load cell and support plate in position within the base member.

During use of the monitoring system 10, the sensor units 14 are each placed under a leg of a piece of furniture, such as a bed. While the piece of furniture is normally a bed, it is noted that the sensor units 14 can be placed under the legs of other pieces of furniture, such as a chair or a sofa. Notably, because the sensor units 14 have a small height dimension, their presence is unobtrusive.

Once the sensor units 14 are in position, the central control unit 12 can be powered and force data can be received from the sensor units. In embodiments in which the monitoring system 10 includes amplifiers 32, the signals received from the sensor units 14 can be amplified and then converted into digital signals that the central controller 28 can use. The central controller 28 can detect the force that is applied by each leg to each sensor unit 14 and this force can be stored as the weight of the bed for calibration purposes.

When the individual lays or sits on the bed, the force sensed by the sensor units 14 increases and the central controller 28 can determine the amount of force provided by the individual by subtracting out the force of the piece of furniture detected during calibration. The net force for each sensor unit 14 can then be used to estimate the weight of the individual. In particular, an algorithm stored in a non-transitory computer-readable medium and executed by the central controller 28 can be used to calculate the weight. In cases in which there is a sensor unit 14 placed beneath each foot of the piece of furniture, the individual weight is simply the sum of the net forces. In cases in which there are fewer sensor units 14 than legs, however, the central controller 28 can estimate the weight based on the force data that has been collected. In some embodiments, the algorithm estimates the weight based upon a calibration performed by placing masses of known weight on the furniture, observing the forces measured by the sensor units 14, and correlating the forces to the known weights.

In addition to estimating the weight of the individual, the central controller 28 also records the time when the individual gets onto the furniture, the time when the individual gets off of the furniture, and the duration of time the individual spends on the furniture during each occupancy session. This information can be wirelessly transmitted to a central server or other computer for recordation and analysis. Notably, this data collection and analysis is performed without requiring any action on the part of the individual being monitored. As such, the monitoring system 10 is completely passive.

One can learn much about the habits and health of the individual from the information obtained from the monitoring system. For example, the amount of sleep the individual is getting can be gleaned from the collected data. This information is important as sleep is critical to good health, but too much time in a bed may point to a physical or mental problem. In addition, it can be determined if the individual gains or loses weight over time, weight also being important to good health.

While the disclosed monitoring systems have been described as comprising sensor units that are connected to a central control unit that has a central controller and a wireless communications component, it is noted that, in other embodiments, each sensor unit can include its own central controller and wireless communications component. In such a case, each sensor unit can, on its own, analyze the data collected by its load cell and wirelessly transmit information to the central server or other computer.

In such a case, the central control unit and the communication cables would not be needed. In still other embodiments, the sensor units may not comprise their own central controllers but the central control unit and the sensor units include wireless communication components. In this embodiment also, communication cables would not be necessary.

It is further noted that the central control unit and/or the sensor units can be powered with internal power sources, such as rechargeable batteries. In such an embodiment, the system would not require a power cable or a nearby source of power, such as a wall power outlet. If the sensor units included wireless communication devices, such a system would be truly wireless and, therefore, comprise no cable at all.

Furthermore, while the monitoring system has been described as an at-home monitoring system as this is a target application for the system, the system need not be limited to at-home monitoring situations. More generally, the monitoring system can monitor for individuals occupying any piece of furniture, or other object, that the individuals may occupy.

A finite element analysis (FEA) model was developed to determine the anticipated reaction forces at each leg of bed in a situation in which a sensor unit was placed under each leg. The bed was modeled as a table made of steel, with a length of 80 in, a width of 60 in, square legs with cross-sectional width of 1 in and a of length 12 in (from the top surface of the table top), and side length of 4 in. The table was placed in the center and coincident with a cast iron floor that was 100 in square. The analysis assumed surface-to-surface contact between the bottom of the legs and the floor with no penetration, and the top surface of the floor was given fixed geometry. The FEA model was created with a solid mesh with tetrahedral 3D solid elements and mesh refinements where the legs of the frame contact the floor. The bed frame analysis was conducted using dimensions equivalent to a queen size bed and the weight used was 640 lbf and an assumed weight of 160 lbf for the occupant of the bed.

A distributed load ($F_{bed}$) was added to the entire table top. The simulation was run, and as it was expected, this load split evenly among all four legs. Then the table top was divided into 64 equally sized elements and a second distributed load (F) was added within one of the elements. The reaction forces (R) for Leg 1 for each element were recorded in Table 1 below for a 640 lbf primary load and a 160 lbf secondary load. The simulation was repeated for the 16 elements in one quadrant of the table top. Since the model was symmetrical, it was assumed that the responses would be mirrored about the center for the other three quadrants, so a complete model was established for Legs 1 and 2 corresponding to the headboard legs.

TABLE 1

| Reaction data for Leg 1 for each segment. | | | | | | | | |
|---|---|---|---|---|---|---|---|---|
| Vertical Element Location | Horizontal Element Location | | | | | | | |
| | 1 | 2 | 3 | 4 | 5 | 6 | 7 | 8 |
| 1 | 318 | 296 | 273 | 250 | 227 | 205 | 182 | 160 |
| 2 | 296 | 277 | 257 | 238 | 218 | 198 | 179 | 159 |
| 3 | 274 | 258 | 241 | 225 | 208 | 192 | 176 | 159 |
| 4 | 251 | 238 | 225 | 212 | 199 | 186 | 173 | 160 |
| 5 | 229 | 219 | 209 | 199 | 190 | 180 | 170 | 160 |
| 6 | 206 | 199 | 193 | 187 | 180 | 174 | 167 | 161 |
| 7 | 184 | 180 | 177 | 174 | 171 | 168 | 164 | 161 |
| 8 | 162 | 162 | 161 | 161 | 161 | 161 | 161 | 160 |

The plot of the data indicated that the response was linear ($R \approx 1$) along the edges adjacent to the leg being investigated, with the maximum being approximately $F_{bed}/4+F$ and the minimum being approximately $F_{bed}/4$ with respect to the proportional distance from one leg to the next. For the proportional distance to the diagonal leg, the relationship was nonlinear. The optimum fit was a second-degree polynomial ($R^2 \approx 1$). Based on this data, the assumed relationship $R=A+Bx+Cy+Dxy$ was tested in MATLAB®.

The complete data for Leg 1 was compiled in MATLAB® and a multiple-variable regression model was determined to be:

$$R_1 = 341.88 - 194.98x - 192.38y + 207.27xy \text{ lbf}$$

where R is the reaction force, x is the ratio of horizontal distance to width, y is the ratio of the vertical distance to length. The reaction due to the primary load ($F_{bed}/4$) was separated out, and the secondary load (F) was factored out of the remaining coefficients to obtain:

$$R_1 = F_{bed}/4 + F(1.1368 - 1.218x - 1.2024y + 1.2954xy) \text{ lbf}$$

This model was verified against the FEA model by checking different values of $F_{bed}$, F, width, length, x, and y. The model was consistent within approximately 3 lbf for each combination of values tested, including extrapolated values at the edges of the surface elements. This model is valid for leg 1 only. For Leg 2, (1−x) is substituted for x:

$$R_2 = F_{bed}/4 + F[1.1368 - 1.2186(1-x) - 1.2024y + 1.2954(1-x)y] \text{ lbf}$$

for Leg 3, (1−y) is substituted for y:

$$R_3 = F_{bed}/4 + F[1.1368 - 1.2186x - 1.2024(1-y) + 1.2954x(1-y)] \text{ lbf}$$

and both substitutions are made for Leg 4:

$$R_4 = F_{bed}/4 + F[1.1368 - 1.2186(1-x) - 1.2024(1-y) + 1.2954(1-x)(1-y)] \text{ lbf}$$

By taking all four reaction forces and summing them, the weight of the entire system (bed and person) can be established.

By using only the measurements for Leg 1 and Leg 2, it is possible to calculate an estimate of the weight with known error bounds. It is assumed that Leg 1 and Leg 2 would be measuring one-half the weight of the entire system. The weight is estimated by adding the two measurements (taken from left and right sides of the bed) and multiplying it by two:

$$W = 2[(R_1 + R_2) - F_{bed}/2] \text{ lbf}$$

The person's x position does not influence the error estimate. The error can be constrained by also assuming the person could only lay in a certain range of the y direction. Here, a 50th percentile male was measured relative to a queen-sized bed and the center of gravity was assumed to be at the navel. The person could only lay in a range of 40% to 50% of they direction, so these were the limits used to calculate the error.

Values of y from 0.4 to 0.5 in increments of 0.1 were used to calculate the reaction forces on each leg using the mathematical model described above. Based on these parameters, the error is approximately 22% when the person is laying as close to the headboard as possible without touching the headboard, and 0% when the person's feet are even with the end of the bed. These values will vary slightly with the length of the bed (e.g., for a twin bed) and the height of the person.

The error due to the model can be eliminated by placing sensors under all four legs and summing them. Without the assumption that two legs have one-half of the weight, and with reactions at all four legs measured, the error would be reduced by an order of magnitude.

Further refinement of the two-sensor model can be made by measuring the weight of a person using two sensors and comparing it to the known weight of the person. This comparison could be used to calculate the position on the bed where the person typically sleeps. Now, instead of assuming Legs 1 and 2 carry one-half of the weight of the person, Legs 1 and 2 would carry (1−y) times the weight of the person, where y is the calculated location of the person based. Therefore, the error is corrected by dividing the sum of Legs 1 and 2 by (1−y). The formula for estimating the weight of a person using two sensors and a known sleeping position in the y-direction is given by:

$$W = [(R_1 + R_2) - F_{bed}/2]/(1-y) \text{ lbf}$$

where y, in this case, is the person's known position on the bed. The error bounds using is method is approximately 2% at y=0.4 and 0% at y=0.5. The calculations for the error and corrected error are shown in Table 2 below. All of this error is due to the multiple variable linear regression based on the FEA model.

TABLE 2

Error bound calculation data.

| | | | | | | | | | | | |
|---|---|---|---|---|---|---|---|---|---|---|---|
| F | | | | | | 160 | | | | | |
| $F_{bed}$ | | | | | | 640 | | | | | |
| x | | | | | | 0.5 | | | | | |
| y | 0.40 | 0.41 | 0.42 | 0.43 | 0.44 | 0.45 | 0.46 | 0.47 | 0.48 | 0.49 | 0.50 |
| $R_1$ | 209 | 263 | 261 | 259 | 257 | 255 | 253 | 251 | 250 | 248 | 246 |
| $R_2$ | 209 | 153 | 153 | 153 | 153 | 154 | 154 | 154 | 154 | 154 | 154 |
| Measured Weight | 196 | 192 | 188 | 185 | 181 | 178 | 174 | 171 | 167 | 164 | 160 |
| Error | 22% | 20% | 18% | 16% | 13% | 11% | 9% | 7% | 4% | 2% | 0% |
| Corrected Weight | 163 | 163 | 162 | 162 | 162 | 162 | 161 | 161 | 161 | 160 | 160 |
| Corrected Error | 2% | 2% | 2% | 1% | 1% | 1% | 1% | 1% | 0% | 0% | 0% |

The invention claimed is:

1. A monitoring system, the monitoring system comprising:
   a sensor unit configured to be placed under a piece of furniture, the sensor unit including:
      a housing including a top plate and a base member that define an interior space;
      a load cell configured to measure forces imposed by the piece of furniture, the load cell including a plate having a deformable element and a sensor mounted to the plate at a location at which the deformable element extends from an outer perimeter of the plate that surrounds the deformable element; and
      an internal platform provided within the interior space and extending upwardly from an inner base surface of the base member, the internal platform supports the plate of the load cell in a manner in which the deformable element is free to deform responsive to forces imposed by the piece of furniture.

2. The monitoring system of claim 1, further comprising:
   a communications component configured to transmit force data measured by the load cell to a remote device communicatively coupled to the sensor unit.

3. The monitoring system of claim 2, wherein the communications component is positioned within the housing of the sensor unit.

4. The monitoring system of claim 2, further comprising:
   a remote device communicatively coupled to the sensor unit, the remote device configured to receive and analyze the force data from the load cell.

5. The monitoring system of claim 4, wherein the remote device includes a central controller or a central server.

6. The monitoring system of claim 4, wherein the remote device is configured to determine a set of times when an individual gets on and off of the piece of furniture.

7. The monitoring system of claim 4, wherein the remote device is configured to determine a weight of an individual occupying the piece of furniture.

8. The monitoring system of claim 7, wherein the remote device is configured to determine the weight of the individual by executing an algorithm stored in a non-transitory computer-readable medium configured to calculate a net force associated with the weight of the individual based upon the force data and a weight of the piece of furniture.

9. A method for monitoring forces imposed on pieces of furniture, the method comprising:
   placing a sensor unit underneath a piece of furniture;
   sensing, with the sensor unit, forces imparted to the sensor unit by the piece of furniture with a load cell provided within the sensor unit, the load cell including a plate having a deformable element and a sensor mounted to the plate at a location at which the deformable element extends from an outer perimeter of the plate that surrounds the deformable element;
   determining, with a controller, a weight of an individual based upon the sensed forces by determining a net force associated with the weight of the individual based upon the sensed forces received from the load cell and the weight of the piece of furniture; and
   transmitting information determined by the controller to a remote computing device for recordation and analysis.

10. The method of claim 9, further comprising:
determining, with the controller, one or more durations of time during which an individual occupies the piece of furniture.

11. The method of claim 9, wherein placing the sensor unit underneath the piece of furniture includes placing the sensor unit underneath a leg of the piece of furniture.

12. The method of claim 9, wherein placing the sensor unit underneath the piece of furniture includes placing the sensor unit underneath a bed.

13. A monitoring system, comprising:
a set of sensor units, wherein each sensor unit is configured to be placed under a piece of furniture and including a load cell configured to measure forces imposed by the piece of furniture, the load cell including a plate having a deformable element and a sensor mounted to the plate at a location at which the deformable element extends from an outer perimeter of the plate that surrounds the deformable element;
a controller communicatively coupled to the set of sensor units, the controller configured to receive and analyze force data from the set of sensor units; and
a wireless communications component configured to transmit information determined by the controller to a remote computing device.

14. The monitoring system of claim 13, wherein the remote computing device is a central server.

15. The monitoring system of claim 13, wherein the controller is configured to determine a set of times when an individual gets on and off of the piece of furniture.

16. The monitoring system of claim 13, wherein the controller is configured to determine a weight of an individual providing the force imposed by the piece of furniture.

17. The monitoring system of claim 16, wherein the monitoring system includes one sensor unit for each leg of the piece of furniture and wherein the weight of the individual is calculated by summing forces measured by the sensor units, calculating a total weight based upon the sum of the forces, and subtracting the weight of the piece of furniture from the total weight.

18. The monitoring system of claim 16, wherein the controller is configured to determine the weight of the individual by executing an algorithm stored in a non-transitory computer-readable medium configured to calculate a net force associated with the weight of the individual based upon the force data and a weight of the piece of furniture.

19. The monitoring system of claim 13, wherein the monitoring system is a passive monitoring system.

20. The monitoring system of claim 13,
wherein the controller and the wireless communications component are contained within a central control unit that is separate from but in communication with the set of sensor units;
wherein the remote computing device is a central server;
wherein the controller is configured to determine a set of times when an individual gets on and off of the piece of furniture and to determine a weight of an individual providing the force imposed by the piece of furniture;
wherein the controller is configured to determine the weight of the individual by executing an algorithm stored in a non-transitory computer-readable medium configured to calculate a net force associated with the weight of the individual based upon the force data and a weight of the piece of furniture determined during system calibration; and
wherein the monitoring system includes one sensor unit for each leg of the piece of furniture and wherein the weight of the individual is calculated by summing forces measured by the sensor units, calculating a total weight based upon the sum of the forces, and subtracting the weight of the piece of furniture from the total weight.

* * * * *